(12) United States Patent
Tange et al.

(10) Patent No.: US 10,570,302 B2
(45) Date of Patent: Feb. 25, 2020

(54) AQUEOUS INK AND AQUEOUS DYE DISPERSION FOR AQUEOUS INK

(71) Applicant: SANYO COLOR WORKS, Ltd., Hyogo (JP)

(72) Inventors: Kosuke Tange, Himeji (JP); Toshiaki Makino, Himeji (JP)

(73) Assignee: SANYO COLOR WORKS, Ltd., Hyogo (JP)

( * ) Notice: Subject to any disclaimer, the term of this patent is extended or adjusted under 35 U.S.C. 154(b) by 58 days.

(21) Appl. No.: 15/755,903

(22) PCT Filed: Aug. 29, 2016

(86) PCT No.: PCT/JP2016/075159
§ 371 (c)(1),
(2) Date: Feb. 27, 2018

(87) PCT Pub. No.: WO2017/038747
PCT Pub. Date: Mar. 9, 2017

(65) Prior Publication Data
US 2019/0031898 A1    Jan. 31, 2019

(30) Foreign Application Priority Data
Aug. 31, 2015   (JP) .................... 2015-171251

(51) Int. Cl.
C09D 11/38 (2014.01)
C09B 1/14 (2006.01)
B41M 5/00 (2006.01)
C09D 11/328 (2014.01)

(52) U.S. Cl.
CPC ......... *C09D 11/328* (2013.01); *B41M 5/0023* (2013.01)

(58) Field of Classification Search
None
See application file for complete search history.

(56) References Cited

U.S. PATENT DOCUMENTS

| | | | |
|---|---|---|---|
| 5,382,561 A * | 1/1995 | Mori ............... | B41M 5/345 428/913 |
| 7,077,874 B2 * | 7/2006 | Inuzuka ........... | C09D 11/32 8/471 |
| 2015/0130881 A1 * | 5/2015 | Oguchi ........... | C09D 11/40 347/103 |

FOREIGN PATENT DOCUMENTS

| | | |
|---|---|---|
| JP | H08-100133 A | 4/1996 |
| JP | 2007-231074 A | 9/2007 |
| JP | 2015-93957 A | 5/2015 |
| JP | 2016-108520 A2 | 6/2016 |

OTHER PUBLICATIONS

English translation of JP 2016/108520, Jun. 2016; 14 pages.*
English translation of JP 2007/231074, Sep. 2007; 30 pages.*
English translation of JPH 08/100133, Apr. 1996; 10 pages.*
Disperse Red 60 datasheet; www.worlddyevariety.com/disperse-dyes/disperse-red-60.html; no date available; 12 pages.*
International Search Report dated Sep. 27, 2016, issued in corresponding International Patent Application No. PCT/JP2016/075159 (4 pages).
Yoon et al.; "Improving the Contrast Ratio of Red Pixels in Liquid-Crystal Displays by Synthesizing Synergists from an Anthraquinone Colorant"; Mol. Cryst. Liq. Cryst.,vol. 553, pp. 102-112, 2010 (6 pages).

* cited by examiner

*Primary Examiner* — Helene Klemanski
(74) *Attorney, Agent, or Firm* — Fitch, Even, Tabin & Flannery LLP

(57) ABSTRACT

An aqueous dye dispersion for an aqueous ink including a dye derivative as indicated at Formula (1) below; a water-insoluble dye; a dispersant; and water, makes it possible to provide an aqueous dye dispersion for aqueous ink, which reduces flocculation of particles within aqueous ink even when the aqueous ink is prepared, and has satisfactory dispersion stability during storage, thereby providing an aqueous ink having satisfactory dispersion stability during storage.

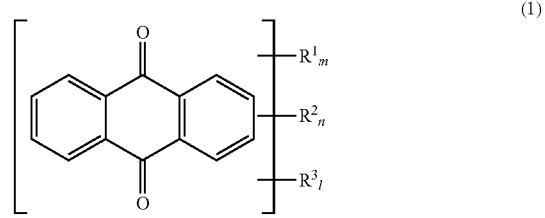

(1)

6 Claims, No Drawings

AQUEOUS INK AND AQUEOUS DYE DISPERSION FOR AQUEOUS INK

TECHNICAL FIELD

The present invention relates to an aqueous dye dispersion for an aqueous ink and to an aqueous ink; more particularly, the present invention relates to an aqueous dye dispersion such as may be used in the manufacture of an aqueous ink for inkjet printing and to an aqueous ink containing same.

BACKGROUND ART

Inkjet printing, widely employed in copiers, printers, facsimile machines, and so forth for home and office use, has, as a result of improvement in print quality in recent years, also come to be utilized for catalogs, magazines, packaging labels, and other such paper items; cans and other such metal products; tiles and other such ceramic products; film and other such resin products; fabric and other such textile products; and other such examples of commercial and/or industrial printing. In such various types of printing, various dyes are employed in correspondence to the type of substrate material that is to be imparted with coloration. For example, disperse dyes and other such water-insoluble dyes are employed when carrying out printing on textile products such as fabrics made of hydrophobic fibers or the like. Known as methods of use of such water-insoluble dyes to carry out printing on fabrics made of hydrophobic fibers are textile printing in which ink is directly applied to fibers, following which steaming or other such heat treatment is employed for fixing of dyes; and textile printing carried out by means of sublimation thermal transfer in which ink is applied to paper or other such intermediate recording medium, following which fibers are brought into contact with the intermediate recording medium, and heat is used to cause dye to be sublimated and transferred from the intermediate recording medium to the fibers (see, for example, Patent Literature 1).

Because the inks employed in textile printing using such water-insoluble dyes generally employ water as solvent, it is necessary to disperse the water-insoluble dyes in water. This being the case, dispersants are generally employed. But because of such issues as the fact that particles in ink that contain the water-insoluble dyes may flocculate and precipitate during or after preparation thereof, dispersion stability during preparation and/or during storage has not always necessarily been satisfactory. Furthermore, because stability during storage is not satisfactory, in the case of an inkjet printer there has also been the problem that stability during jetting has not been satisfactory.

Patent Literature 1 discloses an anthraquinone derivative, though it should be noted that this is disclosed as a dispersant for pigment used in connection with color filters. However, what is disclosed at Patent Literature 1 is little more than particle diameter when pigment for use in color filters is dispersed in a hydrophobic organic solvent and the effect of this on color filter contrast.

PRIOR ART LITERATURES

Patent Literatures

Patent Literature 1: Japanese Unexamined Patent Application Publication No. 2015-93957

NONPATENT LITERATURES

Nonpatent Literature 1: Chun Yoon et al. 'Improving the contrast ratio of red pixels in liquid-crystal displays by synthesizing synergists from an anthraquinone contrast' Mol. Cryst. Liq. Cryst., Vol. 533, pp. 102-112, 2010

SUMMARY OF INVENTION

Problem to be Solved by Invention

For inks in which disperse dyes and/or other such water-insoluble dyes are dispersed in water, even when conventional dispersants are used, particles within the ink flocculate and cause dispersion stability during storage to be less than satisfactory. In light of the fact, the present inventors engaged in intensive study, and found that, notwithstanding that the water-insoluble dye dispersion obtained at the stage prior to preparation of the aqueous ink may have had some degree of dispersion stability, addition of surfactant and/or other components to the dye dispersion during the course of preparation of the aqueous ink caused particles within the aqueous ink to flocculate and particle diameter to increase, resulting in decreased dispersion stability.

It is therefore an object of the present invention to provide an aqueous dye dispersion for aqueous ink, which reduces flocculation of particles within aqueous ink even when the aqueous ink is prepared, and has satisfactory dispersion stability during storage, thereby providing an aqueous ink having satisfactory dispersion stability during storage.

Means for Solving Problem

In light of the foregoing problems, the present inventors engaged in intensive study. As a result, the present inventor arrived at the perfection of the present invention, having discovered that the foregoing problems could be solved through use of a dye derivative having a particular structure. An aspect of the present invention is as follows.

A first aspect of the present invention relates to an aqueous dye dispersion for an aqueous ink comprising a dye derivative as indicated at Formula (1) below; a water-insoluble dye; a dispersant; and water.

[Formula 1]

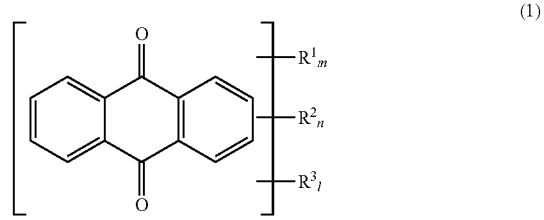

(1)

(At Formula (1), $R^1$ is a group as indicated at Formula (2) below, and $R^2$ is a group as indicated at Formula (3) below. m and n are each 0 or 1 but m+n=1. $R^1$ is a hydroxyl group and/or an amino group. l is 0 to 2; when l=2, $R^3$ may respectively be the same or different.)

(At Formula (1), $R^1$ is a group as indicated at Formula (2) below, and $R^2$ is a group as indicated at Formula (3) below. m and n are each 0 or 1 but m+n=1.)

[Formula 2]

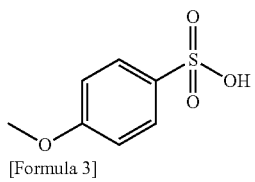
(2)

[Formula 3]

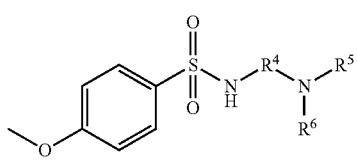
(3)

(At Formula (3), $R^4$ is a phenylene group or an alkylene group having 1 to 4 carbons; $R^5$ and $R^6$ are independently selected alkyl groups having 1 to 4 carbons.)

In the present invention, it is preferable that the dye derivative as indicated at Formula (1) above, is a dye derivative as indicated at Formula (4) below.

[Formula 4]

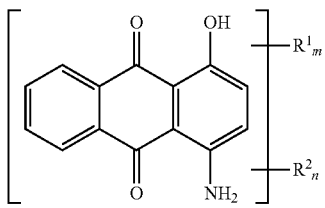
(4)

(At Formula (4), $R^1$ is a group as indicated at Formula (2) above, and $R^2$ is a group as indicated at Formula (3) above. m and n are each 0 or 1 but m+n=1.)

A second aspect of the present invention relates to an aqueous ink comprising the aqueous dye dispersion for the aqueous ink; and a surfactant. It is preferable that the aqueous ink of the present invention is an aqueous ink for inkjet recording.

Advantageous Effects of the Invention

The present invention makes it possible to provide: an aqueous dye dispersion for an aqueous ink, which reduces flocculation of particles within aqueous ink, and has satisfactory dispersion stability during storage; and an aqueous ink that also has satisfactory dispersion stability during storage.

EMBODIMENTS FOR CARRYING OUT THE INVENTION

Aqueous Dye Dispersion for Aqueous Ink

An aqueous dye dispersion for aqueous ink (hereinafter sometimes referred to simply as "dye dispersion") according to the present invention contains a dye derivative indicated by the foregoing Formula (1) (hereinafter sometimes referred to simply as "dye derivative"), a water-insoluble dye, a dispersant, and water. As a result of use of a dye derivative having such prescribed structure, it is possible for particles that contains water-insoluble dye to be stably maintained in their dispersed state; and also with respect to aqueous inks that contains dispersion(s) of said dye(s), it is possible for particles that include water-insoluble dye to be stably maintained in their dispersed state.

Dye derivatives employed in the present invention have a structure as indicated at the foregoing Formula (1).

At Formula (1), $R^1$ is a group as indicated at the foregoing Formula (2), and $R^2$ is a group as indicated at the foregoing Formula (3). m and n are each 0 or 1 but m+n=1; i.e., the dye derivative indicated by Formula (1) has $R^1$ or $R^2$. Furthermore, $R^3$ is a hydroxyl group and/or an amino group. l is 0 to 2; when l=2, $R^3$ may respectively be the same or different. As a result of use of a dye derivative having such structure, the benefit of the present invention can be generally provided regardless of the chemical structure of the water-insoluble dye or the type of dispersant.

In the present invention, where $R^3$ at Formula (1) is one or two hydroxyl group(s) and/or amino group(s), it may be that one each of hydroxyl group and amino group are respectively included in the dye derivative indicated by Formula (1). Where this is the case, there is no particular limitation with respect to the positions of the respective groups. Thereamong, from the standpoint of preventing flocculation of particles within the dye dispersion and of stably maintaining the dispersed state thereof, it is preferred that $R^3$ at Formula (1) be such that one each of hydroxyl group and amino group are respectively included in the dye derivative indicated by Formula (1). Furthermore, in such case, while there is no particular limitation with respect to the positions at which the hydroxyl group and the amino group are bonded thereto, it is preferred as indicated at the foregoing Formula (4) that these be positions 1 and 4 or positions 5 and 8 at Formula (1'), below. Note that, as the substituent groups at Formula (1') are identical to those at Formula (1), there being no structural difference therebetween, the numbers 1 through 8 at Formula (1') having simply been added to the foregoing Formula (1), description thereof will be omitted.

[Formula 5]

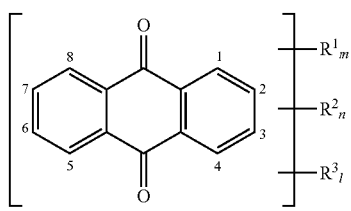
(1')

At Formula (1), when $R^3$ is/are amino group(s), $R^3$ is —$NH_2$, —$NHX^1$, and/or —$NX^1X^2$. Here, $X^1$ and $X^2$ each is a group possessing a carbonyl group, an aryl group, an alkyl group, or a halogen atom; $X^1$ and $X^2$ may be the same or different; and $X^1$ and $X^2$ may be cyclically bonded. Furthermore, when l=2 and two amino groups are contained thereby, $R^3$ may be the same or different.

In the present invention, while there is no particular limitation with respect to the position to which $R^1$ or $R^2$ is bonded thereto, where $R^3$ is for example bonded thereto at positions 1 and 4 or positions 5 and 8 at Formula (1') as indicated at Formula (4), from the standpoint of preventing flocculation of particles within the dye dispersion and of stably maintaining the dispersed state thereof, position 2 or 3, or 6 or 7 at the foregoing Formula (1') is preferred, position 3 being preferred when $R^3$ is such that a hydroxyl group is bonded thereto at position 1, and an amino group is bonded thereto at position 4, at Formula (1').

Furthermore, from the standpoint of preventing flocculation of particles within the dye dispersion and of stably maintaining the dispersed state thereof, $R^2$ is preferred between $R^1$ and $R^2$.

At the foregoing Formula (3), $R^4$ is a phenylene group or an alkylene group having 1 to 5 carbons. As alkylene group having 1 to 5 carbons, —CH$_2$CH$_2$—, —CH$_2$CH$_2$CH$_2$—, —CH(CH$_3$)CH$_2$—, —CH$_2$CH$_2$CH$_2$CH$_2$—, —CH$_2$C(CH$_3$)$_2$CH$_2$—, and so forth may be cited as examples. Furthermore, the alkylene group having 1 to 5 carbons may possess substituent group(s). As such substituent group(s), azo group(s), nitro group(s), alkoxy group(s), group(s) including carbonyl group(s), cyano group(s), halogen atom(s), hydroxyl group(s), amino group(s), and so forth may be cited as examples.

The phenylene group may also possess substituent group(s). As such substituent group(s), alkyl group(s), halogen atom(s), and so forth may be cited as examples. As such an alkyl group(s), those having 1 to 4 carbons are preferred. Furthermore, there may be one substituent group, or there may be two or more thereof. As specific examples of phenylene groups that may possess such substituent group(s), —C$_6$H$_4$—, —C$_6$H$_3$(CH$_3$)—, —C$_6$H$_2$(CH$_3$)$_2$—, —C$_6$H$_2$C$_{12}$—, and so forth may be cited. Thereamong, from the standpoint of preventing flocculation of particles within the dye dispersion and of stably maintaining the dispersed state thereof, it is more preferred that $R^4$ be an alkylene group having 1 to 4 carbons, an alkylene group having 3 carbons, i.e., a trimethylene group, being particularly preferred.

At the foregoing Formula (3), $R^5$ and $R^6$ are independently selected alkyl groups having 1 to 4 carbons. That is, when $R^5$ and $R^6$ are alkyl groups having 1 to 4 carbons, they may be the same or different. As specific examples of alkyl groups having 1 to 4 carbons, —CH$_3$, —CH$_2$CH$_3$, —CH$_2$CH$_2$CH$_3$, —CH$_2$CH$_2$CH$_2$CH$_3$, —CH(CH$_3$)$_2$, and so forth may be cited. The alkyl groups having 1 to 4 carbons may possess substituent group(s). As such substituent group(s), azo group(s), nitro group(s), alkoxy group(s), group(s) including carbonyl group(s), cyano group(s), halogen atom(s), hydroxyl group(s), amino group(s), and so forth may be cited as examples. Thereamong, it is particularly preferred that $R^5$ and $R^6$ be alkyl groups having 2 carbons, i.e., ethyl groups.

While dye derivatives as indicated at Formula (1) might be manufactured as follows in a situation where, for example, a dye as indicated at Formula (5) below is used to obtain the derivative, there is no limitation with respect to such manufacturing methods.

A sulfonation product of a dye as indicated at Formula (5)—i.e., a compound according to Formula (1) for which $R^1$ is a group as indicated at Formula (2) where n=0 and m=1, $R^3$ is hydroxyl group and —NH$_2$, and l=2—may be obtained by causing a dye as indicated at Formula (5) below to react with a sulfur trioxide pyridine complex in organic solvent, or in concentrated sulfuric acid or fuming sulfuric acid.

A sulfonamidization product of a dye as indicated at Formula (5)—i.e., a compound according to Formula (1) for which $R^2$ is a group as indicated at Formula (3) where n=1 and m=0, $R^3$ is hydroxyl group and —NH$_2$, and l=2—may be obtained by causing the desired amine compound to react with a chlorosulfonation product obtained by using thionyl chloride, oxalyl chloride, phosphorus trichloride, or other such chlorinating agent in organic solvent to chlorinate the sulfonation product of the dye obtained as described above, or by causing a dye as indicated at Formula (5) below to react in chlorosulfonic acid.

[Formula 6]

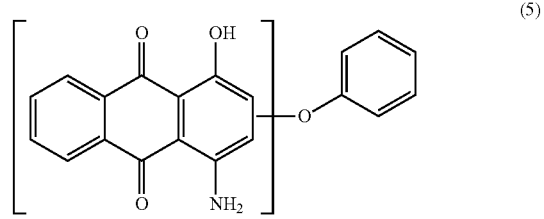

(5)

From the standpoint of dispersion stability, it is preferred that the dye derivative be present in the dye dispersion in an amount that is 0.1 part by weight to 30 parts by weight, and more preferred that this be 0.5 part by weight to 20 parts by weight, for every 100 parts by weight of the water-insoluble dye.

So long as they are dyes which are insoluble or poorly soluble in water, there is no particular limitation with respect to the water-insoluble dyes employed in the present invention. As such dyes, disperse dyes, oil-soluble dyes, acid dyes, and so forth may be cited as examples. Note that "water-insoluble" in the context of the present invention means having a solubility of not more than 1 g/m$^3$ in water at 25° C.

As specific examples of disperse dyes, stating these in terms of their colour index (C. I.) numbers, the following may be cited.

C. I. Disperse Yellow 3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218, 224, and so forth;

C. I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139, 142, and so forth;

C. I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 289, 298, 302, 303, 310, 311, 312, 320, 324, 328, and so forth;

C. I. Disperse Violet 1, 4, 8, 23, 26, 27, 28, 31, 33, 35, 36, 38, 40, 43, 46, 48, 50, 51, 52, 56, 57, 59, 61, 63, 69, 77, and so forth;

C. I. Disperse Green 6:1, 9, and so forth;

C. I. Disperse Brown 1, 2, 4, 9, 13, 19, and so forth;

C. I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, and so forth;

C. I. Disperse Black 1, 3, 10, 24, and so forth.

As specific examples of oil-soluble dyes, stating these in terms of their colour index (C. I.) numbers, the following may be cited.

C. I. Solvent Yellow 1, 2, 3, 5, 6, 13, 14, 16, 19, 21, 22, 29, 33, 36, 37, 38, 39, 40, 43, 44, 45, 47, 62, 63, 71, 76, 81, 85, 86, 93, 114, 151, 157, 163, and so forth;

C. I. Solvent Orange 2, 7, 55, 60, 67, and so forth;

C. I. Solvent Red 1, 3, 8, 18, 23, 24, 27, 35, 36, 37, 38, 39, 40, 43, 48, 49, 51, 52, 58, 60, 65, 69, 81, 86, 89, 91, 92, 97, 99, 100, 109, 111, 118, 119, 122, 125, 127, 130, 132, 135, 145, 146, 149, 150, 151, 155, 168, 176, 179, 180, 181, 195, 207, 218, 225, 233, and so forth;

C. I. Solvent Violet 13, 31, 36, 37, 57, 59, and so forth;

C. I. Solvent Blue 14, 24, 25, 26, 34, 35, 36, 37, 38, 39, 42, 43, 44, 45, 48, 52, 53, 55, 59, 63, 67, 70, 78, 83, 87, 94, 104, 105, 111, 132, 136, and so forth;

C. I. Solvent Green 3, 5, 7, 20, 28, and so forth;

C. I. Solvent Black 3, 5, 7, 8, 14, 17, 19, 20, 22, 24, 26, 27, 28, 43, and so forth.

In the present invention, one water-insoluble dye may be used alone, or two or more thereof may be used in combination.

The average particle diameter of the water-insoluble dye may be chosen as appropriate in correspondence to the intended usage thereof. Here, when for example the aqueous ink that is ultimately obtained is to be used for inkjet printing, it is preferred from the standpoint of jetting characteristics that this be 50 nm to 200 nm. Note that average particle diameter may be measured using dynamic light scattering, laser diffraction, or any other common method.

From the standpoint of tinting strength and ensuring sufficient degrees of freedom in the composition upon manufacturing ink, it is preferred that the water-insoluble dye be present in an amount (solids content) that is 1 wt % to 25 wt % of the total weight of the dye dispersion.

There being no particular limitation with respect to the dispersants employed in the present invention, resin-type dispersants, surface-active-agent-type dispersants, and so forth may be cited as examples thereof. Furthermore, based on the difference between the amine number and the acid value of the resin, resin-type dispersants include acid-value-type dispersants for which the amine number is 0 and the acid value is greater than 0, amine-number-type dispersants for which the acid value is 0 and the amine number is greater than 0, and dispersants for which the acid value and the amine number are greater than 0.

As resin-type dispersants, polyurethane; polyester; unsaturated polyamide; phosphate ester; polycarboxylic acid and amine salts, ammonium salts, and alkylamine salts thereof; polycarboxylic acid ester; hydroxyl-group-containing polycarboxylic acid ester; polysiloxane; modified polyacrylate; alginates, polyvinyl alcohol, hydroxypropyl cellulose, carboxymethylcellulose, hydroxyethyl cellulose, methyl cellulose, polyvinyl pyrrolidone, gum arabic, and other such water-soluble high-molecular-weight compounds; styrene-acrylic acid resin, styrene-methacrylic acid resin, styrene-acrylic acid-acrylic acid ester resin, styrene-maleic acid resin, styrene-maleic acid ester resin, methacrylic acid-methacrylic acid ester resin, acrylic acid-acrylic acid ester resin, isobutylene-maleic acid resin, vinyl-ester resin, rosin-modified maleic acid resin, and other such ethylenic-double-bond-containing resins; polyallylamine, polyvinyl amine, polyethylene imine, and other such amine-based resins; and so forth may be cited as examples.

While various resin-type dispersants are commercially available, specific examples of which are given below, there is no particular limitation with respect thereto.

Lubrizol Japan Ltd.: Solsperse 3000, 9000, 13240, 17000, 20000, 24000, 26000, 27000, 28000, 32000, 32500, 38500, 39000, 55000, 41000;

BYK-Chemie Japan K.K.: Disperbyk 108, 110, 112, 140, 142, 145, 161, 162, 163, 164, 166, 167, 171, 174, 182, 190, 2000, 2001, 2015, 2050, 2070, 2150, LPN6919, LPN21116;

BASF Corporation: EFKA 4401, 4403, 4406, 4330, 4340, 4010, 4015, 4046, 4047, 4050, 4055, 4060, 4080, 5064, 5207, 5244, PX4701;

Ajinomoto Fine-Techno Co., Inc.: Ajisper-PB821(F), PB822, PB880;

Kawaken Fine Chemicals Co., Ltd.: Hinoact T-8000;

Kusumoto Chemicals, Ltd.: Disparlon PW-36, Disparlon DA-325, 375, 7301; and so forth.

While there is no particular limitation with respect to molecular weight of resin-type dispersants, it is preferred that weight-average molecular weight thereof be 1000 to 30000.

Acid value and amine number of the resin-type dispersant are determined based on the functional group(s) and amount(s) thereof, contained in the resin(s) that make up the resin-type dispersant. Acid value (equivalent acid value as calculated based on solids content) might, for example, be determined by a method in accordance with DIN EN ISO 2114, and the amine number (equivalent amine number as calculated based on solids content) might, for example, be determined by a method in accordance with DIN 16945. While there is no particular limitation with respect to the acid value of acid-value-type dispersants, it is preferred that this be 10 to 200; while there is no particular limitation with respect to the amine number of amine-number-type dispersants, it is preferred that this be 20 to 160. While there is no particular limitation with respect to dispersants for which the acid value and the amine number are greater than 0, it is preferred that acid value be 20 to 160, and it is preferred that the amine number be 30 to 150.

As surface-active-agent-type dispersants, in correspondence to ionicity, naphthalene sulfonic acid formaldehyde condensation salts, aromatic sulfonic acid formaldehyde condensates, polyoxyethylene alkyl phosphate esters, and other such anionic active agents (anionic-type), polyoxyethylene alkyl ether and other such nonionic active agents (nonionic-type), alkylamine salts, quaternary ammonium salts, and other such cationic active agents (cationic-type), and so forth may be cited as examples. While various surface-active-agent-type dispersants are also commercially available, specific examples of which are given below, there is no particular limitation with respect thereto.

Kao Corporation: Demol N, RN, MS, SN-B; Emulgen 120, 430; Acetamin 24, 86; Quartamin 24P;

Nikko Chemicals Co., Ltd.: NIKKOL BPS-20, BPS-30, DHC-30, BPSH-25;

DKS Co. Ltd.: Plysurf AL, A208F;

Lion Corporation: Arquad C-50, T-28, T-50, and so forth.

Dispersants such as the foregoing may be used alone, or two or more thereof may be used in combination. When two or more of dispersants are to be used in combination, while examples include, e.g., for resin-type dispersants, combination of acid-value-type and amine-number-type dispersants, or those employing different resins; or, e.g., for surface-active-agent-type dispersants, combination of dispersants having different ionicities (e.g., anionic and nonionic), and so forth, there is no limitation with respect thereto.

From the standpoint of dispersion stability, it is preferred that the dispersant be present in the dye dispersion in an amount (solids content or effective ingredient content) that is 30 parts by weight to 200 parts by weight, and more preferred that this be 50 parts by weight to 150 parts by weight, for every 100 parts by weight of the water-insoluble dye. Note, however, that the optimum amount of dispersant that is added thereto should be adjusted as appropriate depending upon such factors as combination with a type of the water-insoluble dye to be used.

While there is no particular limitation with respect to the water employed in the present invention, deionized water, distilled water, ultrapure water, or other such water having few impurities is preferred. Furthermore, water that has been subjected to treatment for sterilization thereof may be employed.

While the amount of water present in the dye dispersion may be chosen as appropriate in correspondence to the intended usage thereof, this will generally be 200 parts by weight to 8500 parts by weight for every 100 parts by weight of the water-insoluble dye.

In a dye dispersion according to the present invention, to improve wetting characteristics of the water-insoluble dye, to adjust the solubility thereof, and/or to ensure fluidity thereof, water-soluble organic solvent may be contained in the present embodiment of the dye dispersion. As such water-soluble organic solvent, any of those described below may be employed. It is preferred that this or these be present in an amount that is generally 0.4 part by weight to 500 parts by weight for every 100 parts by weight of the water-insoluble dye.

In a dye dispersion according to the present invention, additives other than the foregoing respective components may be contained to the extent that they do not interfere with the benefit of the present invention. As such additives, pH adjustors, antioxidants, ultraviolet light absorbers, preservatives, antifungal agents, antifoaming agents, and so forth may be cited as examples. While the respective amounts of such additives present therein should be such as to cause usage to be within ranges as will permit functionality to be imparted thereby, it is preferred that these generally be 0.4 part by weight to 500 parts by weight for every 100 parts by weight of the water-insoluble dye.

The dye dispersion might, for example, be manufactured as follows.

The foregoing respective components described above might be mixed, and a sand mill (bead mill), roll mill, ball mill, paint shaker, ultrasonic disperser, high-pressure emulsifier, or the like might be used to carry out dispersion and obtain the dye dispersion.

Description will be given in terms of an example in which a sand mill is used. First, the respective components and the beads that will serve as dispersing medium are placed in the sand mill. As beads, glass beads, zirconia beads, or other such beads of particle diameter 0.01 mm to 1 mm may, for example, be employed. With regard to the amount of beads used, it is preferred that these be added in an amount that is 2 to 6 times the weight of the dye dispersion. The sand mill is thereafter actuated and dispersion is carried out. Dispersion conditions are preferably carried out at about 1000 rpm to 2000 rpm for 1 hour to 20 hours. In addition, after dispersion has been carried out, a filter or the like is used to remove the beads and obtain the dye dispersion.

As described above, the dye dispersion according to the present invention is such that use of a dye derivative having a structure as indicated at Formula (1) makes it possible for particles that include water-insoluble dye to be stably maintained in their dispersed state. That is, as described below, it is possible to prevent flocculation of particles within the dye dispersion and to effectively prevent the average particle diameter from increasing during storage of the dye dispersion. Furthermore, it is also possible to effectively suppress precipitation of particles.

Aqueous Ink

An aqueous ink according to the present invention includes a surfactant and an aqueous dye dispersion for aqueous ink according to the present invention as described above. Thus use of a dye dispersion according to the present invention in the form of an aqueous ink also makes it possible to prevent flocculation of particles within the dye dispersion and to effectively prevent the average particle diameter from increasing during storage of the dye dispersion.

Aqueous inks according to the present invention contain dye dispersions. While the content amount of the dye dispersions may be chosen as appropriate in correspondence to the intended usage thereof and so forth, it is preferred from the standpoint of tinting strength that the amount of dye dispersion contained in the aqueous ink be such as to cause the amount of water-insoluble dye present therein to be 0.1 wt % to 10 wt % of the total weight of the ink.

There being no particular limitation with respect to the surfactants capable of being employed in the present invention, surfactants commonly employed in aqueous inks may be employed in the embodiment of the present invention. Surfactant may increase ability of aqueous ink to wet substrate material and improve penetrative characteristics of aqueous ink. As such surfactant, from the standpoint of ionicity, any among the anionic type, cationic type, amphoteric type, and nonionic type may be employed. Furthermore, from the standpoint of also improving responsiveness during jetting of ink in the context of inkjet printing and so forth, silicone-type surfactants, fluorinated-type surfactants, and so forth are preferred.

As anionic surfactants, alkyl sulfocarboxylates, α-olefin sulfonates, polyoxyethylene alkylether acetates, N-acylamino acids and salts thereof, N-acylmethyl taurine salts, alkylsulfate polyoxyalkylether sulfates, alkylsulfate polyoxyethylene alkylether phosphates, rosin acid soaps, castor oil sulfate ester salts, lauryl alcohol sulfate ester salts, alkylphenol-type phosphate esters, alkyl-type phosphate esters, alkylaryl sulfonates, diethyl sulfosuccinates, diethylhexyl sulfosuccinates, dioctyl sulfosuccinates, and so forth may be cited as examples.

As cationic surfactants, 2-vinylpyridine derivatives, poly 4-vinylpyridine derivatives, and so forth may be cited as examples.

As amphoteric surfactants, lauryl dimethylaminoacetic acid betaine, 2-alkyl-N-carboxymethyl-N-hydroxyethyl imidazolinium betaine, coconut oil fatty acid amide propyldimethylaminoacetic acid betaine, polyoctylpolyaminoethylglycine, other imidazoline derivatives, and so forth may be cited as examples.

As nonionic surfactants, polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether, and other such ether-type substances; polyoxyethylene oleic acid ester, polyoxyethylene distearate, sorbitan laurate, sorbitan monostearate, sorbitan monooleate, sorbitan sesquioleate, polyoxyethylene monooleate, polyoxyethylene stearate, and other such ester-type substances; 2,4,7,9-tetramethyl-5-decyne-4,7-diol, 3,6-dimethyl-4-octyne-3,6-diol, 3,5-dimethyl-1-hexyne-3-ol, and other such acetylene-glycol(alcohol)-type substances, and so forth may be cited as examples.

As silicone-type surfactants, unmodified polyorganosiloxanes, ether-modified polyorganosiloxanes, ester-modified polyorganosiloxanes, epoxy-modified polyorganosiloxanes, amine-modified polyorganosiloxanes, carboxyl-modified polyorganosiloxanes, fluorine-modified polyorganosiloxanes, alkyloxy-modified polyorganosiloxanes, mercapto-modified polyorganosiloxanes, (meth)acryl-modified polyorganosiloxanes, phenol-modified polyorganosiloxanes, phenyl-modified polyorganosiloxanes, carbinol-modified polyorganosiloxanes, and aralkyl-modified polyorganosiloxanes may be cited as examples.

Such silicone-type surfactants may be synthesized or commercially available versions thereof may be purchased. As commercially available versions thereof, DISPERBYK-306, 307, 333, 337, 341, 345, 346, 347, 348, 349, 378 (the foregoing being manufactured by BYK-Chemie Japan K.K.), KF-351A, 352A, 353, 354L, 355A, 615A, 945, 640, 642, 643, 6011, 6012, 6015, 6017, 6020, X-22-4515 (the foregoing being manufactured by Shin-Etsu Chemical Co., Ltd.), and so forth may be cited as examples. Here, the silicone-type surfactants are not limited to the above.

As fluorinated-compound-type surfactants, those having perfluoroalkyl group(s) may be cited as examples. As such surfactants, Megaface 144D manufactured by DIC Corporation, Surflon S-141, 145, Surflon S-131, 132, 211 manufactured by Asahi Glass Co., Ltd., and so forth may be cited as examples. Here, the fluorinated-compound-type surfactants are not limited to the above.

Surfactants such as the foregoing may be used alone, or two or more thereof may be used in combination.

In the present invention, while the amount of surfactant that is present therein may be chosen as appropriate in correspondence to the intended usage thereof, it is preferred from the standpoints of ink miscibility and ability to wet the substrate material to be imparted with coloration that, within aqueous ink, this be 0.1 wt % to 5 wt % of the total weight of the aqueous ink.

In an aqueous ink according to the present invention, more water may be added to adjust the concentration of the water-insoluble dye. While the amount of water that is added may be determined as appropriate in correspondence to the intended usage of the aqueous ink and so forth, it is preferred that water be added in an amount such that the amount of the water including water that is present in the dye dispersion becomes 40 wt % to 85 wt % of the total weight of the aqueous ink. That is, in an aqueous ink according to the present invention, it is preferred that the amount of water contained be 40 wt % to 85 wt % of the total weight of the aqueous ink. As water, note that those described above as being capable of being used in the dye dispersion may be employed here.

In an aqueous ink according to the present invention, additives may be contained, in addition to dye dispersion, surfactant, and water to be added as necessity. As such additives, water-soluble organic solvents, pH adjustors, chelating reagents, corrosion inhibitors, antioxidants, ultraviolet light absorbers, preservatives, antifungal agents, antifoaming agents, and so forth may be cited as examples. The respective content amounts of such additives should be determined to allow the respective additives to be functional.

As water-soluble organic solvents, there being no particular limitation with respect thereto, methanol, ethanol, isopropyl alcohol, and other such monohydric alcohols, polyhydric alcohols, acetone, diacetone alcohol, and other such ketones or keto alcohols, tetrahydrofuran, dioxane, and other such cyclic ethers may be cited as examples. Thereamong, from the standpoints of prevention of solidification and reduction of volatilization of ink within inkjet printers, polyhydric alcohols are preferred. As such polyhydric alcohols, diethylene glycol, triethylene glycol, tetraethylene glycol, dipropylene glycol, tripropylene glycol, polyethylene glycol, polypropylene glycol, and other such oxyethylene- or oxypropylene-containing polymers; ethylene glycol, propylene glycol, trimethylene glycol, butlyene glycol, hexylene glycol, and other such alkylene glycols having an alkylene group that contains 2 to 6 carbon atoms; 1,2,6-hexanetriol and other such triols; thiodiglycol; glycerine; and so forth may be cited as examples.

It is preferred that the content of the water-soluble organic solvent be in an amount that is 1 wt % to 40 wt % of the total weight of the aqueous ink.

As pH adjustor, there being no particular limitation with respect thereto, so long as it is a compound capable of adjusting pH of the aqueous ink to be within the range 6 to 11, there is no particular restriction with respect thereto. Sodium hydroxide, potassium hydroxide, lithium hydroxide, and other such hydroxides of alkali metals; triethanolamine, diethanolamine, dimethylethanolamine, diethylethanolamine, and other such tertiary amines; aqueous ammonia; and so forth may be cited as examples.

It is preferred that the content of the pH adjustor be in an amount that is 0.1 wt % to 5 wt % of the total weight of the aqueous ink.

The dye dispersion and surfactant, as well as any of the foregoing additives and water to be added as necessary, may be placed in a stirrer to be stirred in accordance with the usual method to obtain the aqueous ink.

The aqueous ink according to the present invention contains a dye dispersion obtained using the foregoing dye derivative. Accordingly, the foregoing aqueous ink can be stored in stable fashion despite presence of other components such as may be contained in the aqueous ink, because flocculation of particles within the aqueous ink is effectively reduced.

Because the foregoing aqueous ink is thus capable of being stored in stable fashion, it is capable of being applied to various uses. For example, it may be favorably employed as recording ink for printers, copiers, and facsimile machines for home and office use, and as ink for printing (or recording) on catalogs, magazines, packaging labels, and other such paper items, cans and other such metal products, tiles and other such ceramic products, film and other such resin products, fabric and other such textile products, and other such materials to be imparted with coloration. In particular, flocculation of particles within the aqueous ink can be reduced, so that the flocculation of particles after refilling of ink can also be reduced, thereby achieving storage in stable fashion. Accordingly, high stability during jetting can be achieved, and the aforementioned aqueous ink is thus favorably employed as an inkjet recording ink. Furthermore, with respect to inkjet printing on fabric and other such textile products, the aqueous ink according to the present invention may be employed as ink for directly printing on fabric serving as the material to be imparted with coloration, or it may be employed as ink for printing on an intermediate recording medium that is made of paper or resin and that serves as the material to be imparted with coloration which is then used to carry out sublimation thermal transfer onto fabric.

EXAMPLES

Hereinafter, embodiments of the present invention are described in more specific terms with reference to examples.

Manufacturing Example 1: Manufacture of Dye Derivative a 504 parts by weight of concentrated sulfuric acid and 400 parts by weight of 28% fuming sulfuric acid were mixed, 66.26 parts by weight of C. I. Disperse Red 60 (KP PLAST Red B manufactured by Kiwa Chemical Industry Co., Ltd.; hereinafter referred to as "PLAST Red B") was mixed thereinto in such fashion as to not exceed 30° C., and was reacted with being stirred for 3 hours at 30° C. The reaction liquid obtained was discharged into a large volume of icewater and allowed to crystallize. The crystals obtained were separated by filtration and were thereafter washed in pure water and dried at 80° C. to obtain 51.7 parts by weight of Dye Derivative a. Identification of the chemical structure of the obtained Dye Derivative a was carried out using an AXIMA-CFR plus matrix-assisted laser desorption ionization/time-of-flight mass spectrometer (MALDI-TOF-MS) manufactured by Shimadzu Corporation in positive ion mode with an α-cyano-4-hydroxycinnamic acid (CHCA) matrix. As a result, a molecular ion peak was observed at m/z=411. This value agrees with the monoisotopic mass corresponding to the situation that exists at Formula (1) when m is 1, n is 0, $R^1$ is at position 3 at Formula (1'), and the hydroxyl group and —$NH_2$ of $R^3$ are respectively at positions 1 and 4 at Formula (1').

Manufacturing Example 2: Manufacture of Dye Derivative b 500 parts by weight of chlorosulfonic acid was cooled in an ice bath to a temperature not higher than 10° C., 66.26 parts by weight of PLAST Red B was mixed thereinto in such fashion as to not exceed 30° C., and was reacted with being stirred for 2 hours at 30° C. The reaction liquid obtained was discharged into a large volume of icewater and allowed to crystallize. The crystals obtained were separated by filtration and were thereafter washed in pure water to obtain a reddish brown aqueous paste. This was dispersed in 2000 parts by weight of cold water, was mixed with 78.14 parts by weight of diethylaminopropylamine at a temperature not higher than 10° C., and was reacted with being stirred for 3 hours at 10° to 20° C. The reaction liquid obtained was separated by filtration, was further washed in cold pure water, and was dried at 80° C. to obtain 98.5 parts by weight of Dye Derivative b.

Furthermore, upon performing identification of the chemical structure of Pigment Derivative b in the same manner as at Manufacturing Example 1, a molecular ion peak was observed at m/z=524. This value agrees with the monoisotopic mass corresponding to the situation that exists at Formula (1) when m is 0, n is 1, $R^2$ is at position 3 at Formula (1'), the hydroxyl group and —$NH_2$ of $R^3$ are respectively at positions 1 and 4 at Formula (1'), and, at Formula (3), $R^4$ is an alkylene group having 3 carbons (trimethylene group), and $R^5$ and $R^6$ are alkyl groups having 2 carbons (ethylene group).

Example 1

15 parts by weight of PLAST Red B serving as water-insoluble dye, 1 part by weight of Dye Derivative a obtained at Manufacturing Example 1, 22.5 parts by weight of resin-type dispersant (DISPERBYK-190; manufactured by BYK-Chemie; 40 wt % solids content; acid-value-type dispersant having an acid value of 10 mg-KOH/g), 61.5 parts by weight of deionized water, and 460 parts by weight of zirconia beads of diameter 0.3 mm were placed in a sand mill, and dispersion was carried out at 1500 rpm for 15 hours. The zirconia beads were thereafter removed to obtain a dye dispersion. The composition of the dye dispersion obtained was as indicated at TABLE 1, and the content amount of disperse dye has been adjusted so as to be 15 wt %.

Example 2

Except for the fact that 9 parts by weight of EFKA PX4701 (manufactured by BASF; 100 wt % resin content; amine-number-type dispersant having amine number of 40 mg-KOH/g) serving as resin-type dispersant was used instead of 22.5 parts by weight of DISPERBYK-190, and 75 parts by weight of deionized water was used instead of 61.5 parts by weight thereof, the same procedure as at Example 1 was used to obtain an aqueous dye dispersion. The composition of the dye dispersion obtained was as indicated at TABLE 1.

Example 3

Except for the fact that surface-active-agent-type dispersants in the form of 9 parts by weight of Demol SN-B (manufactured by Kao Corporation; 95 wt % effective ingredient content; anionic) and 2 parts by weight of NIKKOL BPS-30 (manufactured by Nikko Chemicals Co., Ltd.; 100 wt % solids content; nonionic) were used instead of 22.5 parts by weight of resin-type dispersant in the form of DISPERBYK-190, and 73 parts by weight of deionized water was used instead of 61.5 parts by weight thereof, the same procedure as at Example 1 was used to obtain a dye dispersion. The composition of the dye dispersion obtained was as indicated at TABLE 1.

Example 4

Except for the fact that Dye Derivative b from Manufacturing Example 2 was used instead of Dye Derivative a from Manufacturing Example 1, the same procedure as at Example 1 was used to obtain a dye dispersion. The composition of the dye dispersion obtained was as indicated at TABLE 1.

Example 5

Except for the fact that 9 parts by weight of EFKA PX4701 (manufactured by BASF; 100 wt % resin content) serving as resin-type dispersant was used instead of 22.5 parts by weight of DISPERBYK-190, and 75 parts by weight of deionized water was used instead of 61.5 parts by weight thereof, the same procedure as at Example 4 was used to obtain a dye dispersion. The composition of the dye dispersion obtained was as indicated at TABLE 1.

Example 6

Except for the fact that surface-active-agent-type dispersants in the form of 9 parts by weight of Demol SN-B (manufactured by Kao Corporation; 95 wt % effective ingredient content) and 2 parts by weight of NIKKOL BPS-30 (manufactured by Nikko Chemicals Co., Ltd.; 100 wt % solids content) were used instead of 22.5 parts by weight of resin-type dispersant in the form of DISPERBYK-190, and 73 parts by weight of deionized water was used instead of 61.5 parts by weight thereof, the same procedure as at Example 4 was used to obtain a dye dispersion. The composition of the dye dispersion obtained was as indicated at TABLE 1.

Comparative Example 1

Except for the fact that no dye derivative was used instead of 1 part by weight of Dye Derivative a, and 62.5 parts by weight of deionized water was used instead of 61.5 parts by weight of deionized water, the same procedure as at Example 1 was used to prepare a dye dispersion. The composition of this dye dispersion was as indicated at TABLE 1.

Example 7

Except for the fact that C. I. Disperse Yellow 54 was used instead of C. I. Disperse Red 60 as disperse dye, the same procedure as at Example 1 was used to prepare a dye dispersion. The composition of this dye dispersion was as indicated at TABLE 2.

Example 8

Except for the fact that surface-active-agent-type dispersants in the form of 9 parts by weight of Demol SN-B and 2 parts by weight of NIKKOL BPS-30 were used instead of 22.5 parts by weight of resin-type dispersant in the form of DISPERBYK-190, and 73 parts by weight of deionized water was used instead of 61.5 parts by weight thereof, the same procedure as at Example 7 was used to obtain a dye dispersion. The composition of the dye dispersion obtained was as indicated at TABLE 2.

Example 9

Except for the fact that Dye Derivative b from Manufacturing Example 2 was used instead of Dye Derivative a from Manufacturing Example 1, the same procedure as at Example 7 was used to obtain a dye dispersion. The composition of the dye dispersion obtained was as indicated at TABLE 2.

Example 10

Except for the fact that surface-active-agent-type dispersants in the form of 9 parts by weight of Demol SN-B and 2 parts by weight of NIKKOL BPS-30 were used instead of 22.5 parts by weight of resin-type dispersant in the form of DISPERBYK-190, and 73 parts by weight of deionized water was used instead of 61.5 parts by weight thereof, the same procedure as at Example 9 was used to obtain a dye dispersion. The composition of the dye dispersion obtained was as indicated at TABLE 2.

Example 11

Except for the fact that C. I. Disperse Blue 359 was used instead of C. I. Disperse Red 60 as disperse dye, the same procedure as at Example 1 was used to prepare a dye dispersion. The composition of this dye dispersion was as indicated at TABLE 2.

Example 12

Except for the fact that surface-active-agent-type dispersants in the form of 9 parts by weight of Demol SN-B and 2 parts by weight of NIKKOL BPS-30 were used instead of 22.5 parts by weight of resin-type dispersant in the form of DISPERBYK-190, and 73 parts by weight of deionized water was used instead of 61.5 parts by weight thereof, the same procedure as at Example 11 was used to obtain a dye dispersion. The composition of the dye dispersion obtained was as indicated at TABLE 2.

Example 13

Except for the fact that Dye Derivative b from Manufacturing Example 2 was used instead of Dye Derivative a from Manufacturing Example 1, the same procedure as at Example 11 was used to obtain a dye dispersion. The composition of the dye dispersion obtained was as indicated at TABLE 2.

Example 14

Except for the fact that surface-active-agent-type dispersants in the form of 9 parts by weight of Demol SN-B and 2 parts by weight of NIKKOL BPS-30 were used instead of 15 parts by weight of resin-type dispersant in the form of DISPERBYK-190, and 73 parts by weight of deionized water was used instead of 61.5 parts by weight thereof, the same procedure as at Example 13 was used to obtain a dye dispersion. The composition of the dye dispersion obtained was as indicated at TABLE 2.

Evaluation 1

Evaluation of the dye dispersions at the Examples and Comparative Example was carried out as follows. Results of evaluation were as shown in TABLES 1 and 2.

—Dispersion Stability Testing—

As for dispersion stability, the tendency for particles within the dye dispersion to flocculate during storage was evaluated in accelerated fashion by using the increasing rate in particle diameter as an indicator.

10 g of each dye dispersion was collected and placed within a sealed container, and this was allowed to stand for 1 week at 60° C. After cooling this to room temperature, a dynamic light-scattering photometer (ELS-8000 manufactured by Otsuka Electronics Co., Ltd.) was used to measure the average particle diameter (A) of particles within the dye dispersion. Note that stability was evaluated based on the increasing rate relative to the average particle diameter (B) that was measured in the same fashion before this was allowed to stand at 60° C. Increasing rate (%) was calculated using the following formula.

$$\text{Increasing rate } (\%) = (A-B)/B \times 100$$

Evaluative criteria were as follows.
GOOD=Increasing rate of average particle diameter was less than 10%
FAIR=Increasing rate of average particle diameter was greater than or equal to 10% but less than 20%
BAD=Increasing rate of average particle diameter was greater than or equal to 20%

—Precipitation Characteristics Testing—

Precipitation characteristics testing was such that the tendency for particles within the dye dispersion to flocculate to the point where precipitation occurred during storage was evaluated in accelerated fashion.

100 g of each dye dispersion was collected and placed within a centrifuge tube, and a centrifugal separator (H-201FR manufactured by Kokusan Co., Ltd.) was used to carry out centrifugal separation for 30 minutes at 5000 rpm. Prior to carrying out the centrifugal separation, a 1 g sample of each dye dispersion was collected in advance and placed within an aluminum cup, the weight of the residue that remained after heating this for 2 hours at 130° C. was measured, and the fractional solids content (C %) prior to carrying out the centrifugal separation per 1 g of sample was calculated. Moreover, following the centrifugal separation, 1 g of liquid supernatant was collected from each centrifuge tube and placed within an aluminum cup, and a similar procedure was employed to calculate the fractional solids content (D %) per 1 g of the liquid supernatant. Precipitation characteristics were evaluated based on the difference between the values calculated for C and D as the precipitation ratio of the solid content. The precipitation ratio (%) was calculated using the following formula.

Precipitation ratio (%)=$C-D$

Evaluative Criteria were as Follows.
GOOD=Precipitation ratio of solid content was less than 1%
FAIR=Precipitation ratio of solid content was greater than or equal to 1% but less than 2%
BAD=Precipitation ratio of solid content was greater than or equal to 2%

Evaluation 2

The dye dispersions at the Examples and Comparative Example were used to prepare aqueous ink, and evaluation of that ink was carried out as follows. Results of evaluation were as shown in TABLES 1 and 2.

—Ink Stability Testing—

1 g of each dye dispersion, 0.1 g of surfactant (DISPER-BYK-348 manufactured by BYK-Chemie), 1 g of glycerine, 1 g of propylene glycol, and 9 g of deionized water were mixed to prepare aqueous ink. For each aqueous ink obtained, stability of the aqueous ink was evaluated by calculating the increasing rate in average particle diameter in the same manner as at "Dispersion Stability Testing".

Evaluative criteria were as follows.
GOOD=Increasing rate of average particle diameter was less than 10%
FAIR=Increasing rate of average particle diameter was greater than or equal to 10% but less than 100%
BAD=Increasing rate of average particle diameter was greater than or equal to 100%

TABLE 1

|  |  | Example | | | | | | Comparative Example |
|---|---|---|---|---|---|---|---|---|
|  |  | 1 | 2 | 3 | 4 | 5 | 6 | 1 |
| Water-insoluble dye | D.R.60[1] | 15 | 15 | 15 | 15 | 15 | 15 | 15 |
|  | D.Y.54[2] | — | — | — | — | — | — | — |
|  | D.B.359[3] | — | — | — | — | — | — | — |
| Derivative | Manufacturing Example 1 | 1 | 1 | 1 | — | — | — | — |
|  | Manufacturing Example 2 | — | — | — | 1 | 1 | 1 | — |
| Dispersant | DISPER BYK-190 | 22.5 | — | — | 22.5 | — | — | 22.5 |
|  | EFKA PX4701 | — | 9 | — | — | 9 | — | — |
|  | Demol SN-B | — | — | 9 | — | — | 9 | — |
|  | NIKKOL BPS-30 | — | — | 2 | — | — | 2 | — |
|  | Water | 61.5 | 75 | 73 | 61.5 | 75 | 73 | 62.5 |
|  | Dispersion stability testing | GOOD | FAIR | FAIR | GOOD | GOOD | GOOD | BAD |
|  | Precipitation characteristics testing | FAIR | FAIR | GOOD | GOOD | GOOD | GOOD | BAD |
|  | Ink stability testing | FAIR | GOOD | FAIR | GOOD | GOOD | GOOD | BAD |

[1]C.I. Disperse Red 60
[2]C.I. Disperse Yellow 54
[3]C.I. Disperse Blue 359

TABLE 2

|  |  | Example | | | | | | | |
|---|---|---|---|---|---|---|---|---|---|
|  |  | 7 | 8 | 9 | 10 | 11 | 12 | 13 | 14 |
| Water-insoluble dye | D.R.60[1] | — | — | — | — | — | — | — | — |
|  | D.Y.54[2] | 15 | 15 | 15 | 15 | — | — | — | — |
|  | D.B.359[3] | — | — | — | — | 15 | 15 | 15 | 15 |
| Derivative | Manufacturing Example 1 | 1 | 1 | — | — | 1 | 1 | — | — |
|  | Manufacturing Example 2 | — | — | 1 | 1 | — | — | 1 | 1 |
| Dispersant | DISPER BYK-190 | 22.5 | — | 22.5 | — | 22.5 | — | 22.5 | — |
|  | EFKA PX4701 | — | — | — | — | — | — | — | — |
|  | Demol SN-B | — | 9 | — | 9 | — | 9 | — | 9 |
|  | NIKKOL BPS-30 | — | 2 | — | 2 | — | 2 | — | 2 |
|  | Water | 61.5 | 73 | 61.5 | 73 | 61.5 | 73 | 61.5 | 73 |
|  | Dispersion stability testing | GOOD | FAIR | GOOD | GOOD | GOOD | FAIR | GOOD | GOOD |
|  | Precipitation characteristics testing | FAIR | FAIR | FAIR | FAIR | GOOD | FAIR | GOOD | GOOD |
|  | Ink stability testing | GOOD | GOOD | GOOD | GOOD | GOOD | GOOD | GOOD | GOOD |

[1]C.I. Disperse Red 60
[2]C.I. Disperse Yellow 54
[3]C.I. Disperse Blue 359

As is clear from TABLES 1 and 2, it can be seen that use of dye derivatives as indicated at Formula (1) permits improvement in stability of aqueous dye dispersions and aqueous inks regardless of the type of dispersant and/or the type of water-insoluble dye employed. It is therefore clear that aqueous inks containing the dye dispersions according to the present invention may be favorably employed for any of various uses, and will in particular be suitable for any of various types of printing for carrying out inkjet recording.

The invention claimed is:

1. An aqueous dye dispersion for an aqueous ink, comprising:
    a dye derivative as indicated at Formula (1) below;
    a water-insoluble dye;
    a dispersant; and
    water;
    wherein Formula (1) is given by

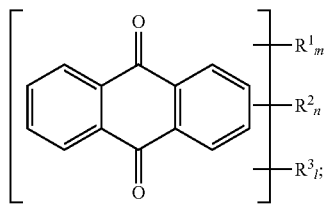
(1)

wherein, at Formula (1),
    $R^1$ is a group as indicated at Formula (2) below;
    $R^2$ is a group as indicated at Formula (3) below;
    m and n are each 0 or 1 but m+n=1;
    $R^3$ is at least one species selected from among a hydroxyl group and an amino group;
    l is 0 to 2; and
    when l=2, $R^3$ is respectively the same or different;
wherein Formula (2) is given by

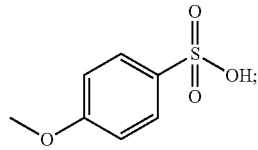
(2)

wherein Formula (3) is given by

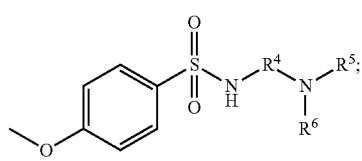
(3)

wherein, at Formula (3),
    $R^4$ is a phenylene group or an alkylene group having 1 to 4 carbons; and
    $R^5$ and $R^6$ are independently selected alkyl groups having 1 to 4 carbons.

2. The aqueous dye dispersion for the aqueous ink according to claim 1,
    wherein the dye derivative as indicated at Formula (1) above, is a dye derivative as indicated at Formula (4) below;
    wherein Formula (4) is given by

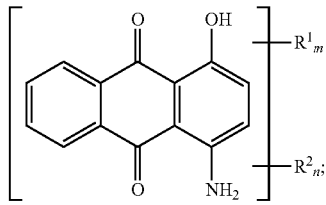
(4)

wherein, at Formula (4),
    $R^1$ is a group as indicated at Formula (2) above;
    $R^2$ is a group as indicated at Formula (3) above; and
    m and n are each 0 or 1 but m+n=1.

3. The aqueous dye dispersion for the aqueous ink according to claim 1, wherein in Formula (1), m=0 and n=1.

4. The aqueous dye dispersion for the aqueous ink according to claim 2, wherein in Formula (4), m=0 and n=1.

5. An aqueous ink comprising:
    the aqueous dye dispersion for the aqueous ink according to claim 1; and
    a surfactant.

6. The aqueous ink according to claim 5 which is for inkjet recording.

* * * * *